US011973420B2

United States Patent
Nagano

(10) Patent No.: US 11,973,420 B2
(45) Date of Patent: Apr. 30, 2024

(54) VOLTAGE SUPPLY DEVICE AND VOLTAGE SUPPLY DEVICE CONTROL METHOD

(71) Applicant: Sharp NEC Display Solutions, Ltd., Tokyo (JP)

(72) Inventor: Yuta Nagano, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 22 days.

(21) Appl. No.: 17/772,059

(22) PCT Filed: Oct. 28, 2019

(86) PCT No.: PCT/JP2019/042121
§ 371 (c)(1),
(2) Date: Apr. 26, 2022

(87) PCT Pub. No.: WO2021/084573
PCT Pub. Date: May 6, 2021

(65) Prior Publication Data
US 2022/0368221 A1    Nov. 17, 2022

(51) Int. Cl.
*H02M 3/02* (2006.01)
(52) U.S. Cl.
CPC ..................... *H02M 3/02* (2013.01)
(58) Field of Classification Search
CPC ....................................................... H02M 3/02
See application file for complete search history.

(56) References Cited

U.S. PATENT DOCUMENTS

| 2012/0092897 | A1* | 4/2012 | Hara ................. H02J 9/005 363/16 |
| 2014/0313792 | A1 | 10/2014 | Nate et al. |
| 2016/0116928 | A1 | 4/2016 | Motoki |
| 2017/0279270 | A1 | 9/2017 | Motoki |
| 2017/0294832 | A1 | 10/2017 | Aoki |
| 2018/0335454 | A1* | 11/2018 | Varsha ............ G01R 19/16504 |

(Continued)

FOREIGN PATENT DOCUMENTS

| JP | H10-337007 A | 12/1998 |
| JP | 2008-160934 A | 7/2008 |

(Continued)

OTHER PUBLICATIONS

International Search Report (ISR) (PCT Form PCT/ISA/210), in PCT/JP2019/042121, dated Jan. 7, 2020.

*Primary Examiner* — Jue Zhang
*Assistant Examiner* — Lakaisha Jackson
(74) *Attorney, Agent, or Firm* — MCGINN I.P. LAW GROUP, PLLC

(57) ABSTRACT

An aspect of the present invention is a voltage supply device including: a controller which outputs a signal indicating any one bus voltage determined by negotiation among a plurality of bus voltages from a power supply circuit to an external device; a reference voltage generation unit which generates a reference voltage corresponding to the signal; a detection voltage output unit which detects the bus voltage and outputs a detection voltage; a comparison unit which compares the detection voltage with the reference voltage; and a switch unit which switches the supply state of the bus voltage to the external device in response to the comparison result.

11 Claims, 7 Drawing Sheets

(56) References Cited

U.S. PATENT DOCUMENTS

| | | | | |
|---|---|---|---|---|
| 2019/0372383 A1* | 12/2019 | Onaka | ............ | H02M 3/02 |
| 2020/0303941 A1* | 9/2020 | Inoue | ............ | H02M 1/36 |
| 2022/0276686 A1* | 9/2022 | Shinoda | ............ | G06F 1/3218 |
| 2022/0317163 A1* | 10/2022 | Lee | ............ | G01R 19/16552 |

FOREIGN PATENT DOCUMENTS

| | | | |
|---|---|---|---|
| JP | 2014-138458 | A | 7/2014 |
| JP | 2016-085591 | A | 5/2016 |
| JP | 2017-174138 | A | 9/2017 |
| JP | 2017-187933 | A | 10/2017 |

* cited by examiner

FIG. 1

| POWER | 5V | 9V | 15V | 20V |
|---|---|---|---|---|
| POWER≤15W | (POWER/5) A | | | |
| 15W<POWER≤27W | 3A | (POWER/9) A | | |
| 27W<POWER≤45W | 3A | 3A | (POWER/15) A | |
| 45W<POWER≤100W | 3A | 3A | 3A | (POWER/20) A |

FIG. 5

| CONTRACT (VBUS) | DETECTION VOLTAGE V1 | OVERVOLTAGE PROTECTION THRESHOLD | REFERENCE VOLTAGE V2 |
|---|---|---|---|
| 5V | 0.5V | 6V | 0.6V |
| 9V | 0.9V | 11V | 1.1V |
| 15V | 1.5V | 18V | 1.8V |
| 20V | 2.0V | 24V | 2.4V |

VOLTAGE SUPPLY DEVICE AND VOLTAGE SUPPLY DEVICE CONTROL METHOD

TECHNICAL FIELD

The present invention relates to a voltage supply device and a voltage supply device control method.

BACKGROUND ART

Regarding the supply of power in USB Power Delivery (USB PD) using a universal serial bus (USB) Type-C connector, power delivery negotiation (PD negotiation) is performed between a source device and a sink device according to a dedicated protocol to determine a voltage/current to be handled and the supply of power is started (for example, see Patent Literature 1 for the connection between the source device and the sink device).

Here, a power supplying side is defined as a source and a power receiving side is defined as a sink. Further, information such as voltage/current values and source/sink roles determined by PD negotiation is defined as a contract. In the following description, a voltage determined by PD negotiation will be referred to as a bus voltage.

USB PD compatible devices (the source device and the sink device) handle a voltage from any voltage to any voltage and need to store a current A to be handled in advance. When the USB PD compatible devices are connected to each other, the sink side selects a desired voltage among the voltages handled by the source side and requests a necessary current value in the range of the current which can be supplied from the source side at the voltage.

FIG. 1 is a diagram showing an example of a USB PD standard. For example, in the case of a source device designed by allocating 60 W for power supply by USB PD, necessary matchings of (bus voltage, current) are (5V, 3 A), (9V, 3 A), (15V, 3 A), or (20V, 3 A) according to the standard of FIG. 1.

On the other hand, since the sink device only needs to handle the voltage required by itself, there are various sink devices such as a sink device that handles only 5V (Non-PD) and not supporting USB PD and a device that handles a voltage up to 9V.

CITATION LIST

Patent Literature

[Patent Literature 1]
Japanese Unexamined Patent Application, First Publication No. 2017-187933

SUMMARY OF INVENTION

Technical Problem

Incidentally, from the viewpoint of the protection function, the source device that supports USB PD is required to implement over current protection (OCP) according to the standard and the sink device that supports USB PD is required to implement over voltage protection (OVP) according to the standard.

However, since the specifications of the sink device to be connected are not known from the source device, there is a risk of destroying the sink device unless OVP is implemented on the source device side as well. Further, for example, when a Non-PD sink device or a sink device that does not conform to a USB PD standard is connected to the source device, there is a risk that the sink device may be damaged due to an overvoltage if a component failure occurs on the source device side.

In order to solve these problems, a method can be considered in which the source device monitors the bus voltage therein supplied to the sink device and prevents the supply of the bus voltage when the bus voltage exceeds an overvoltage protection threshold (OVP threshold).

However, since the bus voltage which is determined by negotiation changes between 5 V and 20 V, it is considered that the sink device is likely to be damaged, for example, when the changed bus voltage is high.

Therefore, there is a problem that the source device needs to prevent the supply of the voltage to the sink device in response to the plurality of bus voltages to be supplied to the sink device.

An object of the present invention is to provide a voltage supply device and a voltage supply device control method capable of solving the above-described problems.

Solution to Problem

In order to solve the above-described problems, an aspect of the present invention is a voltage supply device including: a controller which outputs a signal indicating any one bus voltage determined by negotiation among a plurality of bus voltages from a power supply circuit to an external device; a reference voltage generation unit which generates a reference voltage corresponding to the signal; a detection voltage output unit which detects the bus voltage and outputs a detection voltage; a comparison unit which compares the detection voltage with the reference voltage; and a switch unit which switches the supply state of the bus voltage to the external device in response to the comparison result.

Further, another aspect of the present invention is a voltage supply device control method including: allowing a controller to output a signal indicating any one bus voltage determined by negotiation among a plurality of bus voltages from a power supply circuit to an external device; allowing a reference voltage generation unit to generate a reference voltage corresponding to the signal; allowing a detection voltage output unit to detect the bus voltage and output a detection voltage; allowing a comparison unit to compare the detection voltage with the reference voltage; and allowing a switch unit to switch the supply state of the bus voltage to the external device in response to the comparison result.

Advantageous Effects of Invention

According to an aspect of the present invention, the comparison unit generates an overvoltage protection threshold set for itself to correspond to the bus voltage on the basis of the reference voltage generated by the reference voltage generation unit and enables an off (non-conductive) state of the switch unit by outputting a voltage smaller than the voltage equivalent to the overvoltage protection threshold or enables an on (conductive) state of the switch unit by outputting a voltage equivalent to the overvoltage protection threshold in response to the comparison result between the reference voltage and the detection voltage which is the voltage equivalent to the generated overvoltage protection threshold.

The switch unit prevents the supply of the voltage to the external device when the voltage equivalent to the voltage smaller than the overvoltage protection threshold is input thereto. Further, the switch unit supplies the voltage to the external device when the voltage equivalent to the overvoltage protection threshold is input thereto.

Accordingly, the source device can prevent the supply of the voltage to the external device regardless of the magnitude of the plurality of bus voltages.

BRIEF DESCRIPTION OF DRAWINGS

FIG. 1 is a diagram showing an example of a USB PD standard.

FIG. 5 is a diagram illustrating a detection voltage and a reference voltage shown in FIG. 4.

DESCRIPTION OF EMBODIMENTS

Hereinafter, a reference example and an embodiment of the present invention will be described with reference to the drawings.

Reference Example

Figure 2:
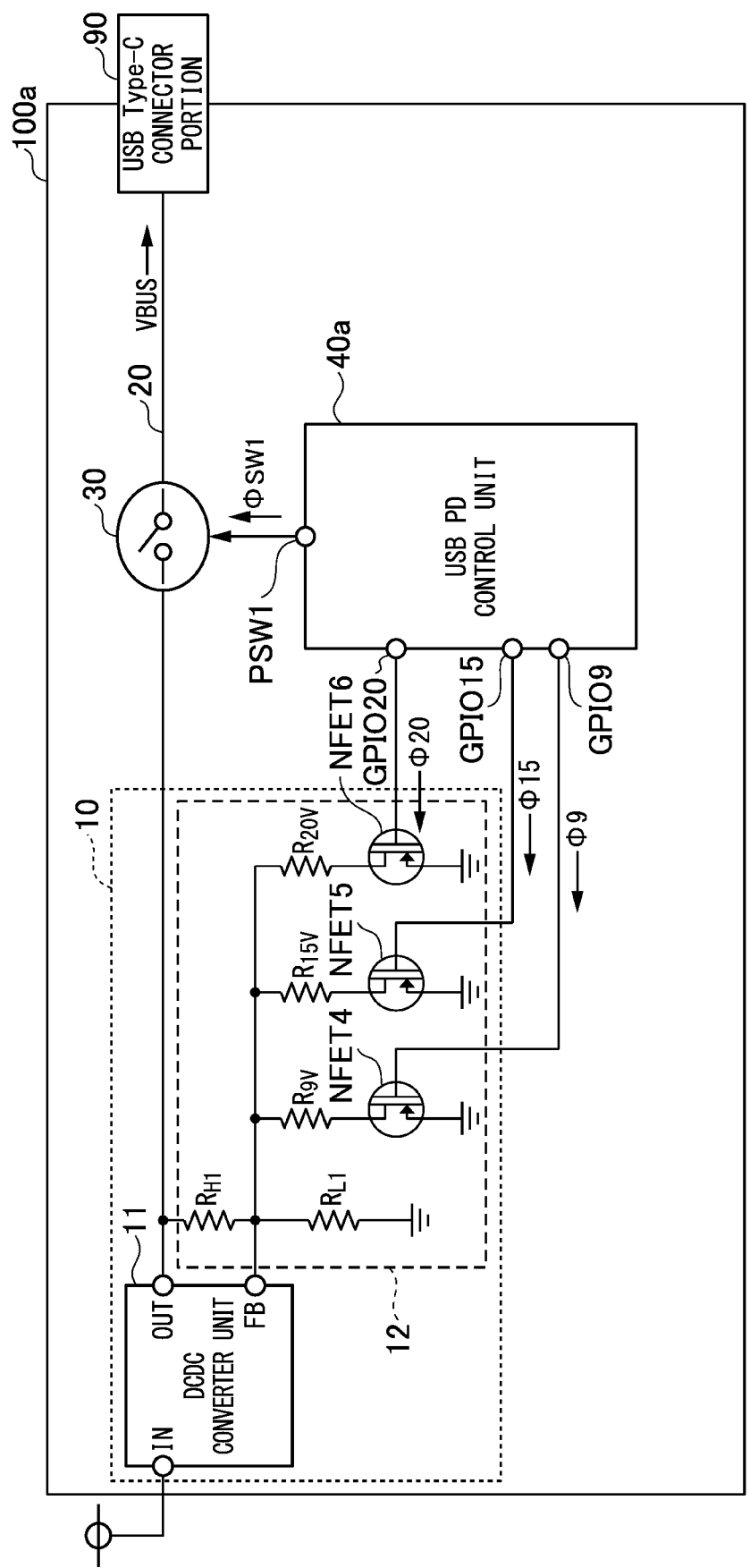
FIG. 2 is a block diagram showing a configuration example of a voltage supply device according to a reference example.

First, FIG. 2 is a block diagram showing a configuration example of a voltage supply device according to the reference example.

A voltage supply device (source device) 100a according to the reference example shown in FIG. 2 includes a power supply circuit 10, a bus line 20, a switch unit 30 (first switch unit), and a USB Type-C connector portion 90 of a voltage supply device 100 according to the embodiment of the present invention to be described later together with a USB PD control unit (controller) 40a.

The power supply circuit 10 supplies a bus voltage VBUS to a sink device which is an external device via the switch unit 30 provided in the bus line 20 and the USB Type-C connector portion 90.

The USB PD control unit 40a controls the power supply circuit 10 and the switch unit 30 so that the bus voltage VBUS is supplied to the sink device via the USB Type-C connector portion 90 (the details will be described later).

Additionally, the USB PD control unit 40a includes a plurality of general-purpose input/output pins (GPIO) which are input/output terminals. The signal output from these pins is a signal Φ indicating any one of the bus voltages VBUS determined by negotiation among the plurality of bus voltages VBUS. Here, in FIG. 2, Φ corresponding to a GPIO9 is indicated by Φ9 (bus voltage VBUS=9 V), Φ corresponding to a GPIO15 is indicated by Φ15 (bus voltage VBUS=15 V), and Φ corresponding to a GPIO20 is indicated by Φ20 (bus voltage VBUS=20 V).

Further, the USB PD control unit 40a includes a PSW1 as an output terminal.

A signal output from the PSW1 is a signal ΦSW1 for enabling a conductive (on) state or a non-conductive (off) state of the switch unit 30.

Further, the USB Type-C connector portion 90 is, for example, a USB connector. The USB connector is a connector that conforms to the USB Type-C standard. A cable of which one end is connected to the switch unit 30 and the other end is connected to the sink device is connected to the USB Type-C connector portion 90. The cable is, for example, a USB cable and is a cable that conforms to the USB Type-C standard. The USB cable includes a VBUS line (bus supply line) which supplies a bus voltage VBUS, a signal line which transmits and receives power information including the bus voltage VBUS, a plurality of signal lines which transmit and receive, for example, video signals and the like, and a ground line. Further, the USB cable may include other signal lines and the like.

The power information (information of bus voltage VBUS, current information) includes information indicating the voltage and current shown in FIG. 1. The USB PD control unit 40a is a device that supplies the bus voltage VBUS and the power information including the bus voltage VBUS to the sink device or the like. The sink device is, for example, a notebook personal computer, and supplies a video signal and the like to the USB PD control unit 40a.

The USB PD control unit 40a transmits and receives each signal via the USB Type-C connector portion 90. For example, when the USB PD control unit 40a is connected to the sink device via the USB Type-C connector portion 90, the USB PD control unit 40a performs predetermined negotiation (transmission/reception of power information and determination of power information) with the sink device. That is, the USB PD control unit 40a transmits the power information including the bus voltage VBUS output from the voltage supply device 100a which is the source device. Further, the USB PD control unit 40a performs control so that the transmitted power information including the bus voltage VBUS is output to the power supply circuit 10 and the bus voltage VBUS is output to the power supply circuit 10.

(Description of Power Supply Circuit 10 and USB PD Control Unit 40a)

The power supply circuit 10 includes a DCDC converter unit 11 and an FB voltage generation unit 12.

The DCDC converter unit 11 converts a DC voltage input to an input pin IN into any one of the plurality of bus voltages VBUS on the basis of an FB voltage input to a feedback pin FB and outputs the converted bus voltage VBUS from an output pin OUT via the switch unit 30 connected in series to the bus line 20.

The FB voltage generation unit 12 includes a fifth resistor $R_{H1}$ and a sixth resistor $R_{L1}$ which are connected in series between the output pin OUT and the GND (ground) and one or more FB selectors which are provided between the GND and the common contact point (feedback pin FB) between the fifth resistor $R_{H1}$ and the sixth resistor $R_{L1}$ and are composed of a resistor and an N-channel metal-oxide semiconductor field-effect transistor (NMOS FET; NFET). Here, FIG. 2 shows three FB selectors including an FB selector composed of a resistor $R_{9V}$ and an NFET4 connected in series to each other, an FB selector composed of a resistor $R_{15V}$ and an NFET5 connected in series to each other, and an FB selector including a resistor $R_{20V}$ and an NFET6 connected in series to each other.

Additionally, Φ9 output from the USB PD control unit 40a is input to the NFET4. Further, Φ15 output from the USB PD control unit 40a is input to the NFET5. Further, Φ20 output from the USB PD control unit 40a is input to the NFET6.

Here, when the sink device is not connected, all the general-purpose input/output pins (GPIO) of the USB PD control unit 40a have a low output. The constants of the fifth resistor $R_{H1}$ and the sixth resistor $R_{L1}$ are determined so that the voltage output from the DCDC converter unit 11 at this time becomes 5 V.

When the sink device is connected, the USB PD control unit 40a outputs high-level ΦSW1 to the switch unit 30 and turns on the switch unit 30. Accordingly, the bus voltage VBUS of 5 V is supplied to the sink device via the bus line 20, the USB Type-C connector portion 90, and the cable.

Then, the USB PD control unit 40a performs PD negotiation between the sink device and the PD via the cable and the USB PD control unit 40a outputs only one signal Φ output from the plurality of general-purpose input/output pins GPIO (GPIO9, GPIO15, GPIO20) to be high in response to the bus voltage VBUS determined by negotiation. Accordingly, the feedback (FB) resistor voltage division ratio of the FB voltage generation unit 12 changes, so that the output voltage increases.

Additionally, when the bus voltage VBUS is 9 V, the signal Φ9 output from the general-purpose input/output pin GPIO09 has a high level. Further, when the bus voltage VBUS is 15 V, the signal Φ15 output from the general-purpose input/output pin GPIO15 has a high level. Further, when the bus voltage VBUS is 20 V, the signal Φ20 output from the general-purpose input/output pin GPIO20 has a high level. Additionally, in the USB PD control unit 40 of the voltage supply device 100 according to the embodiment of the present invention to be described later, the signal Φ5 output from the general-purpose input/output pin GPIO05 has a high level when the bus voltage VBUS is 5 V. However, here, since the constants of the fifth resistor $R_{H1}$ and the sixth resistor $R_{L1}$ are determined so that the voltage output from the DCDC converter unit 11 becomes 5 V as described above, the FB selector that receives the high-level signal Φ5 output from the general-purpose input/output pin GPIO05 is not necessary. Therefore, the general-purpose input/output pin GPIO05 is not necessary in the USB PD control unit 40a.

For example, when the bus voltage VBUS is 9 V, the USB PD control unit 40a outputs only the signal Φ9 output from the GPIO9 to be high. Only one NFET4 (N-ch MOS FET) connected to the resistor $R_{9V}$ (feedback (FB) resistor) of the FB voltage generation unit 12 is turned on.

Accordingly, the low side (sixth resistor $R_{L1}$) of the FB resistor of the FB voltage generation unit 12 is connected in parallel to the resistor $R_{9V}$, so that the FB input voltage of the DCDC converter unit 11 decreases. The output of the DCDC converter unit 11 when the sixth resistor $R_{L1}$ and the resistor $R_{9V}$ are connected in parallel to each other is set to a constant such as 9 V in advance. As a result, the DCDC converter unit 11 receives a feedback in the direction of increasing the output voltage and the bus voltage VBUS which is an output increases until the target bus voltage VBUS becomes 9 V.

Further, when the bus voltage VBUS is 15 V, the USB PD control unit 40a outputs only the signal Φ15 output from the GPIO15 to be high. Only one NFET5 connected to the resistor $R_{15V}$ of the FB voltage generation unit 12 is turned on.

Accordingly, the low side (sixth resistor $R_{L1}$) of the FB resistor of the FB voltage generation unit 12 is connected in parallel to the resistor $R_{15V}$, so that the FB input voltage of the DCDC converter unit 11 decreases. The output of the DCDC converter unit 11 when the sixth resistor $R_{L1}$ and the resistor $R_{15V}$ are connected in parallel to each other is set to a constant such as 15 V in advance. As a result, the DCDC converter unit 11 receives a feedback in the direction of increasing the output voltage and the bus voltage VBUS which is an output increases until the target bus voltage VBUS becomes 15 V.

Further, when the bus voltage VBUS is 20 V, the USB PD control unit 40a outputs only the signal Φ20 output from the GPIO20 to be high. Only one NFET6 connected to the resistor $R_{20V}$ of the FB voltage generation unit 12 is turned on.

Accordingly, the low side (sixth resistor $R_{L1}$) of the FB resistor of the FB voltage generation unit 12 is connected in parallel to the resistor $R_{20V}$, so that the FB input voltage of the DCDC converter unit 11 decreases. The output of the DCDC converter unit 11 when the sixth resistor $R_{L1}$ and the resistor $R_{20V}$ are connected in parallel to each other is set to a constant such as 20 V in advance. As a result, the DCDC converter unit 11 receives a feedback in the direction of increasing the output voltage and the bus voltage VBUS which is an output increases until the target bus voltage VBUS becomes 20 V.

That is, when the bus voltage VBUS is not 5 V (first voltage) which is the minimum voltage among the plurality of bus voltages, the FB voltage generation unit 12 outputs the FB voltage generated at the common contact point between the fifth resistor $R_{H1}$ and the sixth resistor $R_{L1}$ by the FB selector selected by the signal Φ9, the signal Φ15, and the signal Φ20 output from the USB PD control unit 40a and the fifth and sixth resistors $R_{H1}$ and $R_{L1}$ to the DCDC converter unit 11.

On the other hand, the FB voltage generation unit 12 outputs the FB voltage generated at the common contact point between the fifth resistor $R_{H1}$ and the sixth resistor $R_{L1}$ to the DCDC converter unit 11 when the bus voltage VBUS is 5 V (first voltage) which is the minimum voltage among the plurality of bus voltages.

Figure 3:
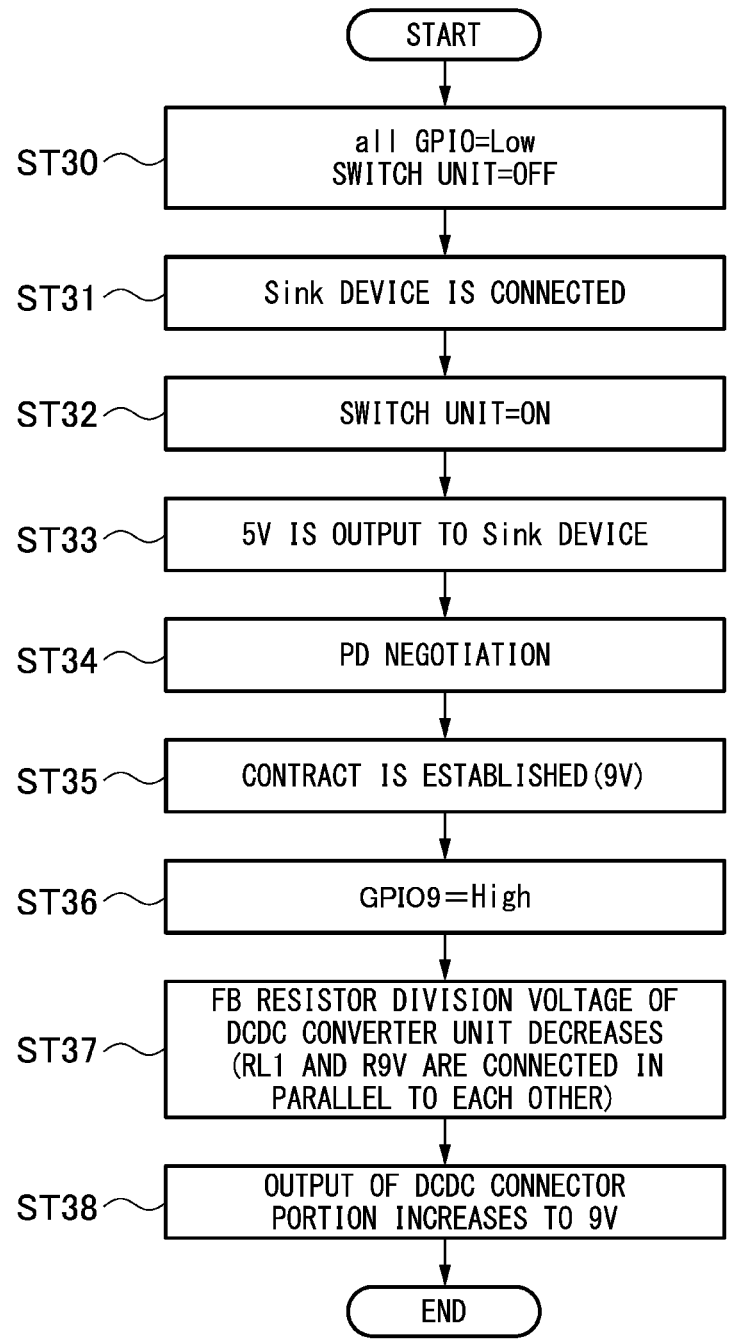
FIG. 3 is a flowchart showing an operation example of a voltage supply device 100a shown in FIG. 2.

An operation of the above-described voltage supply device 100a will be described with reference to FIG. 3. FIG. 3 is a flowchart showing an operation example of the voltage supply device 100a shown in FIG. 2. FIG. 3 shows an operation in which the VBSU voltage corresponding to the voltage of the contract determined by PD negotiation is 9 V. Of course, the VSUB voltage may be another 5 V, 15 V, and 20 V.

When all GPIOs are low, the switch unit is turned off (step ST30).

Specifically, the USB PD control unit 40a outputs all of the signals Φ9, Φ15, and Φ20 output from the general-purpose input/output pin GPIO (GPIO9, GPIO15, GPIO20) to be low before the connection of the sink device. Further, the USB PD control unit 40a outputs the signal ΦSW1 output from the output terminal PSW1 to be low and enables a non-conductive (off) state of the switch unit 30.

The sink device is connected (step ST31).

The sink device is connected to the voltage supply device 100a by the USB Type-C connector portion 90.

The switch unit is turned on (step ST32).

The USB PD control unit 40a outputs the signal ΦSW1 output from the output terminal PSW1 to be high and enables a conductive (on) state of the switch unit 30.

5 V is output to the sink device (step ST33).

The USB PD control unit 40a outputs all of the signals Φ9, Φ15, and Φ20 output from the general-purpose input/output pin GPIO (GPIO9, GPIO15, and GPIO20) to be low.

In the FB voltage generation unit 12 that receives these signals, the FB voltage generated at the common contact point between the fifth resistor $R_{H1}$ and the sixth resistor $R_{L1}$ for determining the constants of the fifth resistor $R_{H1}$ and the sixth resistor $R_{L1}$ so that the voltage output from the DCDC converter unit 11 becomes 5 V is output to the DCDC converter unit 11. Accordingly, the power supply circuit 10 supplies a voltage VBUS of 5 V to the sink device.

PD negotiation is performed (step ST34).

When the USB PD control unit 40a is connected to the sink device via the USB Type-C connector portion 90, the USB PD control unit 40a performs predetermined negotiation (transmission/reception of power information and determination of power information) with the sink device.

The contract is established (step ST35).

The power information is determined. Here, as a result of negotiation, VBUS of 9 V is determined.

The GPIO9 becomes high (step ST36).

The USB PD control unit 40a outputs only one of the signals Φ9, Φ15, and Φ20 output from the plurality of general-purpose input/output pins GPIO (GPIO9, GPIO15, GPIO20) to be high in response to the bus voltage VBUS determined by negotiation. Here, the USB PD control unit 40a outputs only the signal Φ9 output from the general-purpose input/output pin GPIO9 to be high.

The FB resistor division voltage of the DCDC converter unit decreases ($R_{L1}$ and $R_{9V}$ are connected in parallel to each other) (step ST37).

The USB PD control unit 40a turns on only one NFET4 (N-ch MOS FET) connected to the resistor $R_{9V}$ (feedback (FB) resistor) of the FB voltage generation unit 12 by outputting only the signal Φ9 output from the GPIO9 to be high. Accordingly, the low side (sixth resistor $R_{L1}$) of the FB resistor of the FB voltage generation unit 12 is connected in parallel to the resistor $R_{9V}$, so that the FB input voltage of the DCDC converter unit 11 decreases.

The output of the DCDC converter unit increases to 9 V (step ST38).

In the FB voltage generation unit 12, the output of the DCDC converter unit 11 when the sixth resistor $R_{L1}$ and the resistor $R_{9V}$ are connected in parallel to each other is set to a constant such as 9 V in advance. As a result, the DCDC converter unit 11 receives a feedback in the direction of increasing the output voltage, so that the output increases to 9 V.

Embodiment

Figure 4:
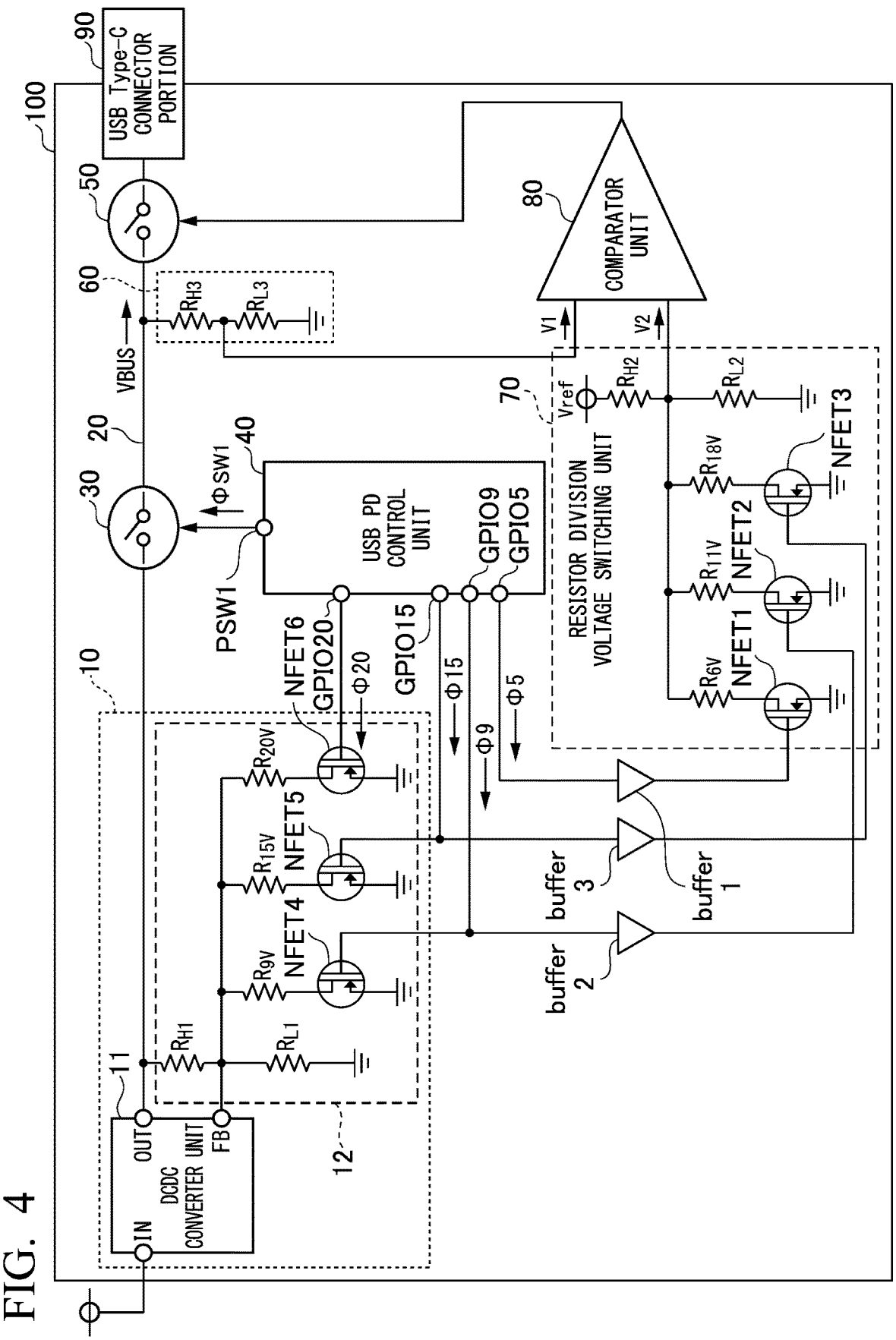
FIG. 4 is a block diagram showing a configuration example of a voltage supply device according to an embodiment of the present invention.

FIG. 4 is a block diagram showing a configuration example of the voltage supply device according to the embodiment of the present invention. FIG. 4 shows the voltage supply device (source device) 100 that adopts an OVP circuit with respect to the voltage supply device 100a according to the reference example shown in FIG. 2. Additionally, in FIG. 4, the same reference numerals are used for the same configurations as those shown in FIG. 2, and the description thereof will be omitted.

The voltage supply device 100 includes the power supply circuit 10, the bus line 20, the switch unit 30, and the USB Type-C connector portion 90 which are included in the voltage supply device 100a together with a USB PD control unit (controller) 40, a protection switch unit 50, a resistor division voltage output unit (detection voltage output unit) 60, a resistor division voltage switching unit (reference voltage generation unit) 70, a comparator unit (comparison unit) 80, and buffers (buffer circuits) 1 to 3 which are not included in the voltage supply device 100a.

Additionally, the OVP circuit of this embodiment includes the protection switch unit (switch unit) 50, the resistor division voltage output unit (detection voltage output unit) 60, the resistor division voltage switching unit (reference voltage generation unit) 70, the comparator unit (comparison unit) 80, and the buffers (buffer circuits) 1 to 3.

In this embodiment, the OVP circuit which realizes a method of changing an OVP threshold on the side of the source device according to the voltage determined by PD negotiation without using an additional IC is proposed.

Here, the difference from the USB PD control unit 40a in the reference example of the USB PD control unit 40 is as below.

The USB PD control unit 40 includes the general-purpose input/output pin GPIO05 and outputs the signal Φ5.

The USB PD control unit 40 outputs the signals Φ5, Φ9, and Φ15 to the resistor division voltage switching unit 70 via the buffers (buffer circuits) 1 to 3.

The resistor division voltage output unit (detection voltage output unit) 60 is composed of a third resistor $R_{H3}$ and a fourth resistor $R_{L3}$ connected in series between the bus voltage VBUS and the ground (GND).

The resistor division voltage output unit 60 detects the bus voltage VBUS and outputs the detection voltage V1 to the comparator unit (comparison unit) 80.

FIG. 5 is a diagram illustrating a detection voltage V1 and a reference voltage V2 shown in FIG. 4. As shown in FIG. 5, the resistor division voltage output unit 60 sets the constant ratio between the third resistor $R_{H3}$ and the fourth resistor $R_{L3}$ to 9:1, detects the voltage divided by the resistor of the bus voltage VBUS, and outputs the detection voltage V1 to one input terminal of two input terminals of the comparator unit 80.

The resistor division voltage switching unit (reference voltage generation unit) 70 is a circuit which generates the reference voltage V2 corresponding to the signal Φ.

As shown in FIG. 5, the resistor division voltage switching unit 70 generates the reference voltage V2 which is the voltage of 1/10 of an overvoltage protection threshold corresponding to the bus voltage VBUS.

The resistor division voltage switching unit 70 includes a first resistor $R_{H2}$ and a second resistor $R_{L2}$ which are connected in series between a predetermined reference voltage Vref and a ground (GND) and one or more selectors which are provided between the ground and the common contact point between the first resistor $R_{H2}$ and the second resistor $R_{L2}$ and are composed of a resistor and an NMOS FET connected in series to each other. Here, FIG. 4 shows three selectors including a selector composed of a resistor $R_{6V}$ and an NFET1, a selector composed of a resistor $R_{11V}$ and an NFET2, and a selector composed of a resistor $R_{18V}$ and an NFET3.

When the bus voltage VBUS is 20 V, the USB PD control unit 40 outputs only the signal Φ20 output from the GPIO20 to be high. All of NFET1 to NEFT3 of the resistor division voltage switching unit 70 are in an off state.

Accordingly, when the bus voltage VBUS is the maximum bus voltage of 20 V among the plurality of bus voltages, the resistor division voltage switching unit 70 can generate the reference voltage V2 of 2.4 V at the common contact point between the first resistor $R_{H2}$ and the second resistor $R_{L2}$.

Here, the values of the first resistor $R_{H2}$, the second resistor $R_{L2}$, and the predetermined reference voltage Vref are set to the values in advance in which the reference voltage V2 of 2.4 V which is 1/10 of an overvoltage protection threshold of 24 V corresponding to the bus voltage VBUS of 20 V is generated at the common contact point between the first resistor $R_{H2}$ and the second resistor $R_{L2}$.

Accordingly, the resistor division voltage switching unit 70 can output the reference voltage V2 of 2.4 V corresponding to the signal Φ20 indicating the bus voltage VBUS to the other input terminal of two input terminals of the comparator unit 80.

Further, when the bus voltage VBUS is 15 V, the USB PD control unit 40 outputs only the signal Φ15 output from the GPIO15 to be high. Only one NFET3 connected to the resistor $R_{18V}$ of the resistor division voltage switching unit 70 is turned on.

Accordingly, when the bus voltage VBUS is 15 V, the selector composed of the resistor $R_{15V}$ and the NFET3 is selected to correspond to the signal Φ15 indicating the bus voltage VBUS.

Here, the value of the resistor $R_{15V}$ is set to the value in advance in which the reference voltage V2 of 1.8 V which is ⅟₁₀ of an overvoltage protection threshold of 18 V corresponding to the bus voltage VBUS of 15 V is generated at the common contact point between the first resistor $R_{H2}$ and the second resistor $R_{L2}$ by the parallel connection of the resistor $R_{15V}$ and the second resistor $R_{L2}$ and the division voltage of the first resistor $R_{H2}$.

Accordingly, the resistor division voltage switching unit 70 can output the reference voltage V2 of 1.8 V corresponding to the signal Φ15 indicating the bus voltage VBUS to one input terminal of two input terminals of the comparator unit 80.

Further, when the bus voltage VBUS is 9 V, the USB PD control unit 40 outputs only the signal Φ9 output from the GPIO9 to be high. Only one NFET2 connected to the resistor $R_{11V}$ of the resistor division voltage switching unit 70 is turned on.

Accordingly, when the bus voltage VBUS is 9 V, the selector composed of the resistor $R_{11V}$ and the NFET2 is selected to correspond to the signal Φ9 indicting the bus voltage VBUS.

Here, the value of the resistor $R_{11V}$ is set to the value in advance in which the reference voltage V2 of 1.1 V which is ⅟₁₀ of an overvoltage protection threshold of 11 V corresponding to the bus voltage VBUS of 9 V is generated at the common contact point between the first resistor $R_{H2}$ and the second resistor $R_{L2}$ by the parallel connection of the resistor $R_{11V}$ and the second resistor $R_{L2}$ and the division voltage of the first resistor $R_{H2}$.

Accordingly, the resistor division voltage switching unit 70 can output the reference voltage V2 of 1.1 V corresponding to the signal Φ9 indicating the bus voltage VBUS to one input terminal of two input terminals of the comparator unit 80.

Further, when the bus voltage VBUS is 5 V, the USB PD control unit 40 outputs only the signal Φ5 output from the GPIO5 to be high. Only one NFET1 connected to the resistor $R_{6V}$ of the resistor division voltage switching unit 70 is turned on.

Accordingly, when the bus voltage VBUS is 5 V, the selector composed of the resistor $R_{6V}$ and the NFET1 is selected to correspond to the signal Φ5 indicating the bus voltage VBUS.

Here, the value of the resistor $R_{6V}$ is set to the value in advance in which the reference voltage V2 of 0.6 V which is ⅟₁₀ of an overvoltage protection threshold of 6 V corresponding to the bus voltage VBUS of 5 V is generated at the common contact point between the first resistor $R_{H2}$ and the second resistor $R_{L2}$ by the parallel connection of the resistor $R_{6V}$ and the second resistor $R_{L2}$ and the division voltage of the first resistor $R_{H2}$.

Accordingly, the resistor division voltage switching unit 70 can output the reference voltage V2 of 0.6 V corresponding to the signal Φ5 indicating the bus voltage VBUS to one input terminal of two input terminals of the comparator unit 80.

The comparator unit 80 compares the detection voltage V1 with the reference voltage V2.

The protection switch unit 50 switches the supply state of the bus voltage VBUS to the external device in response to the comparison result.

The protection switch unit 50 interrupts the supply of the bus voltage VBUS when the detection voltage V1 is larger than the reference voltage V2 and supplies the bus voltage VBUS when the detection voltage V1 is equal to or smaller than the reference voltage V2.

That is, when the detection voltage V1 is larger than the reference voltage V2, the comparator unit 80 outputs, for example, the voltage (for example, GND level) smaller than the voltage equivalent to an overvoltage protection threshold corresponding to the bus voltage VBUS as the output for enabling an off (non-conductive) state of the protection switch unit 50 in response to the comparison result.

Accordingly, the protection switch unit 50 interrupts the supply of the bus voltage VBUS when the voltage smaller than the voltage equivalent to the overvoltage protection threshold corresponding to the bus voltage VBUS is input.

On the other hand, when the detection voltage V1 is equal to or smaller than the reference voltage V2, the comparator unit 80 outputs the voltage equivalent to the overvoltage protection threshold as the output for enabling an on (conductive) state of the protection switch unit 50 in response to the comparison result.

Accordingly, the protection switch unit 50 supplies the bus voltage VBUS when the voltage equivalent to the overvoltage protection threshold equivalent to the bus voltage VBUS is input thereto.

That is, the OVP circuit of the voltage supply device 100 has the overvoltage protection threshold and the OVP circuit can prevent the supply of the voltage to the sink device regardless of the magnitude of the bus voltage VBUS.

Additionally, the overvoltage protection threshold corresponding to the bus voltage VBUS is the threshold of the protection switch unit 50 and the protection switch unit 50 may switch the supply state of the bus voltage VBUS to the external device by the threshold on the basis of the determination result of the comparator unit 80.

That is, the protection switch unit 50 has the overvoltage protection thresholds corresponding to the plurality of bus voltages VBUS, interrupts the supply of the supplied bus voltage VBUS when the supplied bus voltage VBUS is the voltage smaller than the voltage equivalent to the corresponding overvoltage protection threshold, and supplies the bus voltage VBUS when the supplied bus voltage VBUS is the voltage equivalent to the corresponding overvoltage protection threshold.

In any case, the OVP circuit of the voltage supply device 100 has the overvoltage protection threshold and can prevent the supply of the voltage to the sink device regardless of the magnitude of the bus voltage VBUS.

Figure 6:
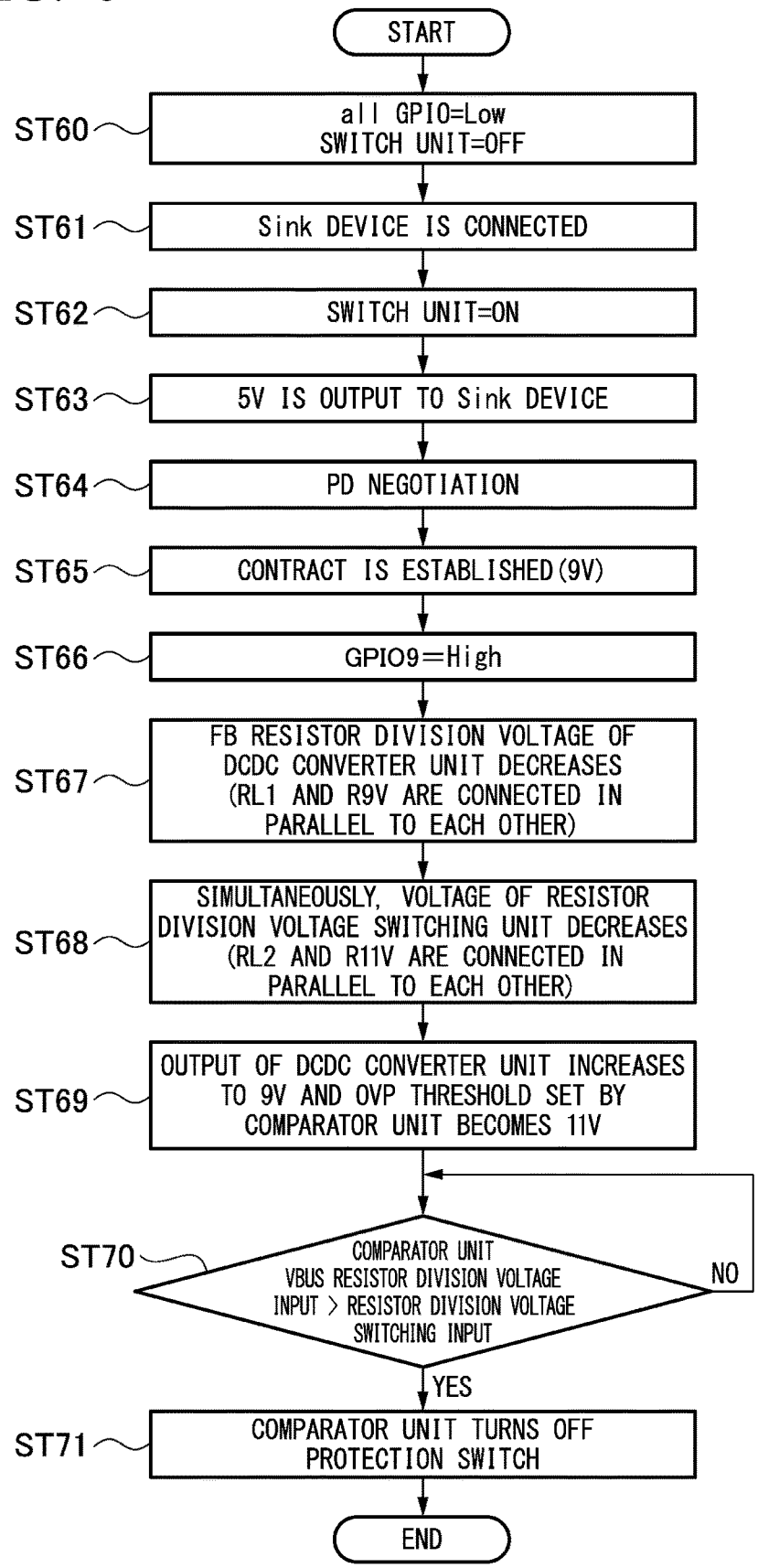
FIG. 6 is a flowchart showing an operation example of a voltage supply device 100 shown in FIG. 4.

An operation of the above-described voltage supply device 100 will be described with reference to FIG. 6. FIG. 6 is a flowchart showing an operation example of the voltage supply device 100 shown in FIG. 4. FIG. 6 shows an operation when the VBSU voltage which is the voltage of the contract determined by PD negotiation is 9 V. Of course, the VSUB voltage may be another 5 V, 15 V, and 20 V.

When all GPIOs are low, the switch unit is turned off (step ST60).

Specifically, the USB PD control unit 40 outputs all of the signals Φ5, Φ9, Φ15, and Φ20 output from the general-purpose input/output pin GPIO (GPIO5, GPIO9, GPIO15, GPIO20) to be low before the connection of the sink device. Further, the USB PD control unit 40 outputs the signal ΦSW1 output from the output terminal PSW1 to be low and enables a non-conductive (off) state of the switch unit 30.

The sink device is connected (step ST61).

The sink device is connected to the voltage supply device 100 by the USB Type-C connector portion 90.

The switch unit is turned on (step ST62).

The USB PD control unit 40 outputs the signal ΦSW1 output from the output terminal PSW1 to be high and enables a conductive (on) state of the switch unit 30.

5 V is output to the sink device (step ST63).

The USB PD control unit 40 outputs all of the signals Φ9, Φ15, and Φ20 output from the general-purpose input/output pin GPIO (GPIO9, GPIO15, and GPIO20) to be low. In the FB voltage generation unit 12 that receives these signals, the FB voltage generated at the common contact point between the fifth resistor $R_{H1}$ and the sixth resistor $R_{L1}$ for determining the constants of the fifth resistor $R_{H1}$ and the sixth resistor $R_{L1}$ so that the voltage output from the DCDC converter unit 11 becomes 5 V is output to the DCDC converter unit 11. Accordingly, the power supply circuit 10 supplies a voltage VBUS of 5 V to the sink device.

PD negotiation is performed (step ST64).

When the USB PD control unit 40 is connected to the sink device via the USB Type-C connector portion 90, the USB PD control unit performs predetermined negotiation (transmission/reception of power information and determination of power information) with the sink device.

The contract is established (step ST65).

The power information is determined. Here, as a result of negotiation, VBUS of 9 V is determined.

The GPIO9 becomes high (step ST66).

The USB PD control unit 40 outputs only one of the signals Φ5, Φ9, Φ15, and Φ20 output from the plurality of general-purpose input/output pins GPIO (GPIO5, GPIO9, GPIO15, GPIO20) to be high in response to the bus voltage VBUS determined by negotiation. Here, the USB PD control unit 40 outputs only the signal Φ9 output from the general-purpose input/output pin GPIO9 to be high.

The FB resistor division voltage of the DCDC converter unit decreases ($R_{L1}$ and $R_{9V}$ are connected in parallel to each other) (step ST67).

The USB PD control unit 40 turns on only one NFET4 (N-ch MOS FET) connected to the resistor $R_{9V}$ (feedback (FB) resistor) of the FB voltage generation unit 12 by outputting only the signal Φ9 output from the GPIO9 to be high. Accordingly, the low side (sixth resistor $R_{L1}$) of the FB resistor of the FB voltage generation unit 12 is connected in parallel to the resistor $R_{9V}$, so that the FB input voltage of the DCDC converter unit 11 decreases.

Simultaneously, the voltage of the resistor division voltage switching unit decreases ($R_{L2}$ and $R_{11V}$ are connected in parallel to each other) (step ST68).

The USB PD control unit 40 turns on only one NFET2 (N-ch MOS FET) connected to the resistor $R_{11V}$ of the resistor division voltage switching unit 70 by outputting only the signal Φ9 output from the GPIO9 to be high. Accordingly, the second resistor $R_{L2}$ of the resistor division voltage switching unit 70 is connected in parallel to the resistor $R_{11V}$, so that the reference voltage V2 output from the resistor division voltage switching unit 70 decreases from 2.4 V to 1.1 V.

The output of the DCDC converter unit increases to 9 V. The comparator unit generates an overvoltage protection threshold (OVP threshold) of 1.1V×10 on the basis of the reference voltage of 1.1 V. The OVP threshold set by the comparator unit becomes 11 V (step ST69).

In the FB voltage generation unit 12, the output of the DCDC converter unit 11 when the sixth resistor $R_{L1}$ and the resistor $R_{9V}$ are connected in parallel to each other is set to a constant such as 9 V in advance. As a result, the DCDC converter unit 11 receives a feedback in the direction of increasing the output voltage and the bus voltage VBUS which is an output increase until the target bus voltage VBUS becomes 9 V.

Further, the OVP threshold (the overvoltage protection threshold set to the comparator unit 80) corresponding to the bus voltage VBUS of 9 V changes from 6 V to 11 V corresponding to the overvoltage protection threshold before the bus voltage VBUS becomes 9 V.

The comparator unit compares whether the VBUS resistor division voltage is larger than the resistor division voltage switching input (step ST70).

That is, the comparator unit 80 compares the detection voltage V1 with the reference voltage V2.

When the detection voltage V1 is larger than the reference voltage V2 (step ST70—Yes), the comparator unit 80 enables an off (non-conductive) state of the protection switch unit 50 by outputting a voltage smaller than the voltage equivalent to the overvoltage protection threshold corresponding to the bus voltage VBUS in response to the comparison result (step ST71).

On the other hand, when the detection voltage V1 is equal to or smaller than the reference voltage V2 (step ST70—No), the comparator unit 80 enables an on (conductive) state of the protection switch unit 50 by outputting a voltage equivalent to the overvoltage protection threshold in response to the comparison result. Then, the comparator unit 80 performs the comparison of step ST70 after a predetermined time elapses.

Accordingly, since the voltage equivalent to the overvoltage protection threshold of 11 V corresponding to the bus voltage VBUS is input to the protection switch unit 50, the voltage smaller than the bus voltage VBUS of 9 V to 11 V (the voltage obtained by adding the overvoltage to the bus voltage) is supplied.

The comparator unit turns off the protection switch (step ST71).

When the voltage smaller than the voltage equivalent to the overvoltage protection threshold corresponding to the bus voltage VBUS is input to the protection switch unit 50 (step ST70—Yes), the supply of the bus voltage VBUS is interrupted.

Accordingly, the voltage supply device 100 can prevent the supply of the voltage to the sink device by the overvoltage protection threshold (11 V) corresponding to the bus voltage VBUS of 9 V.

Further, in this embodiment, an operation example when the bus voltage VBUS is 9 V is shown, but since the above-described operation can be performed even in the case of another bus voltage VBUS, the own OVP threshold (overvoltage protection threshold) is changed in response to the plurality of bus voltages to be supplied to the sink device and hence the supply of the voltage to the sink device can be prevented regardless of the magnitude of the bus voltage.

Further, it is assumed that the voltage supply device 100 or the component in the voltage supply device 100 fails due to, for example, an IN-OUT short failure of the power supply circuit 10, an FB resistor short failure of the power supply circuit 10, or the like when the voltage supply device 100 supplies an arbitrary bus voltage VBUS to the external device. When the output of the bus voltage VBUS becomes equal to or larger than the bus voltage VBUS which is the contract voltage due to this failure, the bus voltage VBUS increases and the detection voltage V1 input to the comparator unit 80 increases. When this voltage exceeds the threshold of the reference voltage V2 set by the resistor division voltage switching unit 70, the comparator unit 80 has an output of turning off the protection switch unit 50 (the voltage smaller than the voltage equivalent to the overvoltage protection threshold) and allows the bus voltage VBUS to be a released state (blocked state). As a result, it is possible to prevent the overvoltage from being continuously applied to the sink device (external device).

Further, when the USB PD control unit 40 fails and the total output Φ becomes high, the switch unit 30 is turned on, the output of the DCDC converter unit 11 becomes the maximum voltage exceeding 20 V, and the high voltage is applied to the sink device via the USB Type-C connector portion 90. In that case, when all signals Φ which are the output of the terminals GPIO are high, all NFETs of the resistor division voltage switching unit 70 are turned on and the overvoltage protection threshold set by the comparator unit 80 becomes the minimum value. That is, the overvoltage protection threshold is set to be lower than 6 V. As a result, an overvoltage is not applied to the sink device.

As described above, since the OVP circuit of this embodiment can be realized only by the resistor, the FET, and the operational amplifier, it can be said that a highly safe protection circuit having a high response speed and a low cost can be realized.

Figure 7:
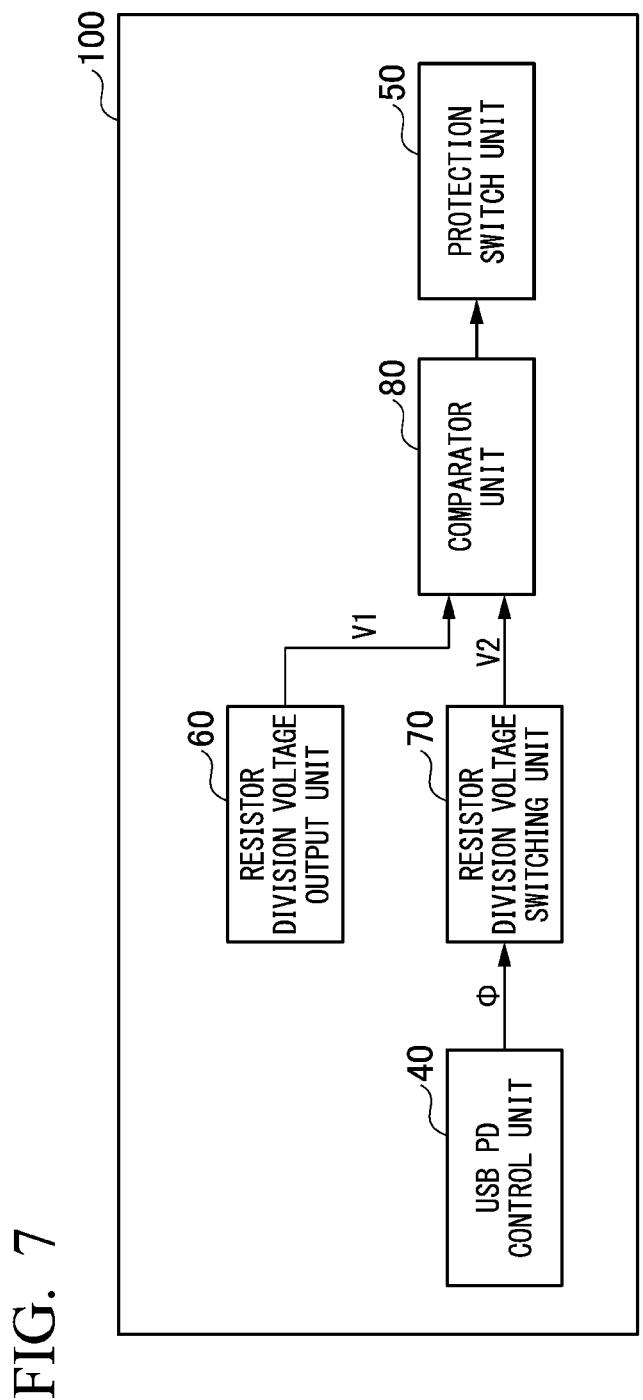
FIG. 7 is a block diagram showing a basic configuration example of the voltage supply device according to the embodiment of the present invention.

Next, a basic configuration example of the embodiment of the present invention will be described with reference to FIG. 7. FIG. 7 is a block diagram showing a basic configuration example of the voltage supply device according to the embodiment of the present invention.

The voltage supply device 100 shown in FIG. 7 includes the USB PD control unit (controller) 40, the resistor division voltage switching unit (reference voltage generation unit) 70, the resistor division voltage output unit (detection voltage output unit) 60, the comparator unit (comparison unit) 80, and the protection switch unit (switch unit) 50.

The USB PD control unit (controller) 40 outputs the signal Φ indicating any one bus voltage VBUS determined by negotiation among the plurality of bus voltages VBUS from the power supply circuit 10 to the external device.

The resistor division voltage switching unit (reference voltage generation unit) 70 generates the reference voltage V2 corresponding to the signal Φ.

The resistor division voltage output unit (detection voltage output unit) 60 detects the bus voltage VBUS and outputs the detection voltage V1.

The comparator unit (comparison unit) 80 compares the detection voltage V1 with the reference voltage V2.

The protection switch unit (switch unit) 50 switches the supply state of the bus voltage VBUS to the external device in response to the comparison result.

According to the above-described configuration of the embodiment of the present invention, the comparator unit 80 generates the overvoltage protection threshold set for itself to correspond to the bus voltage on the basis of the reference voltage V2 generated by the resistor division voltage switching unit 70 and enables an off (non-conductive) state of the switch unit by outputting a voltage smaller than the voltage equivalent to the overvoltage protection threshold or enables an on (conducive) state of the switch unit by outputting a voltage equivalent to the overvoltage protection threshold in response to the comparison result between the reference voltage V2 and the detection voltage V1 obtained by detecting the voltage equivalent to the generated overvoltage protection threshold.

The switch unit prevents the supply of the voltage to the external device when the voltage equivalent to the voltage smaller than the overvoltage protection threshold is input thereto. Further, the switch unit supplies the voltage to the external device when the voltage equivalent to the overvoltage protection threshold is input thereto.

Accordingly, the source device can prevent the supply of the voltage to the external device regardless of the magnitude of the plurality of bus voltages.

Additionally, the present invention is not limited to the above-described embodiment and modifications, improvements, and the like to the extent that the object of the present invention can be achieved are included in the present invention.

For example, in this embodiment, an example in which the bus voltage VBUS is switched from 5V to 9V has been described as an example, but the present invention is not limited thereto.

According to the USB PD standard, the bus voltage VSUB can be switched from any voltage to any voltage. For example, the bus voltage VSUB can be switched from 9V to 15V or from 20V to 5V.

When the bus voltage VSUB is switched in the direction of increasing the voltage level, the protection circuit (OVP circuit) of the present invention does not malfunction, but when the bus voltage VSUB is switched in the direction of decreasing the voltage level, the protection circuit may malfunction.

For example, when the switching of the FB voltage of the DCDC converter unit 11 in the power supply circuit 10 and the switching of the protection circuit threshold (OVP threshold) set by the comparator unit 80 are performed at the same time, the OVP threshold is switched instantly. However, the output of the DCDC converter unit 11 is affected by the capacitor connected on the bus line 20, and it takes time for the voltage drop of the bus voltage VSUB. Therefore, the OVP threshold value may fall below the bus voltage VSUB before the bus voltage VSUB drops to a predetermined voltage (bus voltage VSUB after switching), and the OVP circuit may malfunction.

In order to prevent such failure, as shown in FIG. 4, the buffer (buffer 1, buffer 2, buffer 3) may be connected to a position just before the resistor division voltage switching unit 70 of the protection circuit (OVP circuit) so that the N-ch MOS FET (NFET1, NFET2, NFET3) is turned on with a delay.

Further, the connection position to the bus voltage VBUS of the protection switch unit 50 is disposed at a position just before the USB Type-C connector portion 90 in FIG. 4, but may be at the front stage of the DCDC converter unit 11 or the front stage of the USB PD control unit 40. Further, the resistor division position of the VBUS by the third resistor $R_{H3}$ and the fourth resistor $R_{L3}$ of the resistor division voltage output unit 60 may be at the front stage of the USB PD control unit 40.

REFERENCE SIGNS LIST

10 Power supply circuit
11 DCDC converter unit

12 FB voltage generation unit
20 Bus line
30 Switch unit
40, 40a USB PD control unit
50 Protection switch unit
60 Resistor division voltage output unit
70 Resistor division voltage switching unit
80 Comparator unit
100, 100a Voltage supply device
$R_{H2}$ First resistor
$R_{L2}$ Second resistor
$R_{H3}$ Third resistor
$R_{L3}$ Fourth resistor
$R_{H1}$ Fifth resistor
$R_{L1}$ Sixth resistor
$R_{6V}$, $R_{9V}$, $R_{11V}$, $R_{15V}$, $R_{18V}$, $R_{20V}$ Resistor
1, 2, 3, 4, 5, 6 NFET
Φ1, Φ2, Φ3, Φ4, Φ5, Φ6 Signal

What is claimed is:

1. A voltage supply device comprising:
a controller which outputs a signal indicating any one bus voltage determined from among a plurality of bus voltages based on performing negotiation with an external device when the external device is connected to the voltage supply device;
a power supply circuit which outputs the one bus voltage based on the signal input from the controller;
a reference voltage generation unit which generates, based on the signal input from the controller, a reference voltage corresponding to the signal;
a detection voltage output unit which detects the one bus voltage input from the power supply circuit and outputs a detection voltage;
a comparison unit which compares the detection voltage with the reference voltage; and
a switch unit which switches whether or not to supply the one bus voltage to the external device, based on a result of the comparison.

2. The voltage supply device according to claim 1,
wherein the switch unit interrupts the supply of the one bus voltage when the detection voltage is larger than the reference voltage and supplies the one bus voltage when the detection voltage is equal to or smaller than the reference voltage.

3. The voltage supply device according to claim 1,
wherein the plurality of bus voltages are voltages based on a USB Power Delivery standard.

4. The voltage supply device according to claim 1,
wherein the reference voltage generation unit comprises
a first resistor and a second resistor which are connected in series between a predetermined reference voltage and a ground, and
one or more selectors each of which is provided between the ground and a common contact point between the first resistor and the second resistor and each of which comprises a resistor and an NMOS FET connected in series to each other,
wherein when the one bus voltage is not a maximum bus voltage among the plurality of bus voltages, a first reference voltage generated at the common contact point by the first and second resistors and the selector selected based on the signal input from the controller is output to the comparison unit, and
wherein when the one bus voltage is the maximum bus voltage among the plurality of bus voltages, a second reference voltage generated at the common contact point is output to the comparison unit.

5. The voltage supply device according to claim 4,
wherein a buffer circuit is provided between the controller and at least one of the one or more selectors of the reference voltage generation unit.

6. The voltage supply device according to claim 1,
wherein the detection voltage output unit comprises a third resistor and a fourth resistor connected in series between a bus line of the one bus voltage and a ground.

7. The voltage supply device according to claim 1,
wherein the power supply circuit comprises
a DCDC converter unit which converts a DC voltage input to an input pin into any one bus voltage of the plurality of bus voltages on the basis of an FB voltage input to a feedback pin and outputs the converted bus voltage from an output pin via a first switch unit connected in series to the switch unit, and
an FB voltage generation unit which generates the FB voltage corresponding to each of the plurality of bus voltages.

8. The voltage supply device according to claim 7,
wherein the FB voltage generation unit comprises
a fifth resistor and a sixth resistor which are connected in series to each other between the output pin and a ground, and
one or more FB selectors each of which is provided between the ground and a common contact point between the fifth resistor and the sixth resistor and each of which comprises a resistor and an NMOS FET connected in series to each other,
wherein when the one bus voltage is not a minimum bus voltage among the plurality of bus voltages, a first FB voltage generated at the common contact point by the fifth and sixth resistors and the FB selector selected based on the signal input from the controller is output to the DCDC converter unit, and
wherein when the one bus voltage is the minimum bus voltage among the plurality of bus voltages, a second FB voltage generated at the common contact point is output to the DCDC converter unit.

9. A control method for a voltage supply device, comprising:
allowing a controller to output a signal indicating any one bus voltage determined from among a plurality of bus voltages based on performing negotiation with an external device when the external device is connected to the voltage supply device;
allowing a power supply circuit to output the one bus voltage based on the signal input from the controller;
allowing a reference voltage generation unit to generate, based on the signal input from the controller, a reference voltage corresponding to the signal;
allowing a detection voltage output unit to detect the one bus voltage input from the power supply circuit and output a detection voltage;
allowing a comparison unit to compare the detection voltage with the reference voltage; and
allowing a switch unit to switch whether or not to supply the one bus voltage to the external device, based on a result of the comparison.

10. The control method according to claim 9, further comprising:
allowing the switch unit to interrupt the supply of the one bus voltage when the detection voltage is larger than the reference voltage and supplies the one bus voltage when the detection voltage is equal to or smaller than the reference voltage.

11. The control method according to claim 9, wherein the plurality of bus voltages are voltages based on a USB Power Delivery standard.

* * * * *